US011350634B2

United States Patent
Li et al.

(10) Patent No.: US 11,350,634 B2
(45) Date of Patent: Jun. 7, 2022

(54) **METHOD FOR PREPARING BIOPESTICIDE PREPARATION FOR PREVENTING AND CONTROLLING *SOLENOPSIS INVICTA***

(71) Applicant: GUANGDONG INSTITUTE OF APPLIED BIOLOGICAL RESOURCES, Guangzhou (CN)

(72) Inventors: Jun Li, Guangzhou (CN); Shichou Han, Guangzhou (CN); Jingwen Ye, Guangzhou (CN); Yuke Ya, Guangzhou (CN); Xin Lv, Guangzhou (CN)

(73) Assignee: INSTITUTE OF ZOOLOGY, GUANGDONG ACADEMY OF SCIENCES, Guangzhou (CN)

( * ) Notice: Subject to any disclaimer, the term of this patent is extended or adjusted under 35 U.S.C. 154(b) by 69 days.

(21) Appl. No.: 16/647,029

(22) PCT Filed: Dec. 14, 2017

(86) PCT No.: PCT/CN2017/116136
§ 371 (c)(1),
(2) Date: Mar. 13, 2020

(87) PCT Pub. No.: WO2019/052048
PCT Pub. Date: Mar. 21, 2019

(65) Prior Publication Data
US 2020/0253216 A1 Aug. 13, 2020

(30) Foreign Application Priority Data
Sep. 15, 2017 (CN) .................. 201710835037.X (51) Int. Cl.
*A01N 63/30* (2020.01)
*A01N 25/14* (2006.01)
*A01N 25/22* (2006.01)
*A01N 25/04* (2006.01)
*A01N 59/08* (2006.01)

(52) U.S. Cl.
CPC .............. *A01N 63/30* (2020.01); *A01N 25/04* (2013.01); *A01N 59/08* (2013.01)

(58) Field of Classification Search
None
See application file for complete search history.

(56) References Cited

U.S. PATENT DOCUMENTS 5,679,365 A * 10/1997 Henderson .......... A01N 25/006
424/409
2016/0198906 A1 7/2016 Casey

FOREIGN PATENT DOCUMENTS

| BR | PI1012816 A2 | 1/2015 |
|---|---|---|
| CN | 2361270 Y | 2/2000 |
| CN | 101411338 A | 4/2009 |
| CN | 101323385 B | 6/2011 |
| CN | 202609289 U | 12/2012 |
| CN | 203461292 U | 3/2014 |
| CN | 104686500 A | 6/2015 |
| CN | 104782663 A | 7/2015 |
| CN | 205023197 U | 2/2016 |
| CN | 106586232 A | 4/2017 |
| CN | 106857683 A | 6/2017 |
| CN | 206297939 U | 7/2017 |
| CN | 107455389 A | 12/2017 |

OTHER PUBLICATIONS

Jerry L. Stimac, et al, Beauveria bassiana (Balsamo) Vuillemin (Deuteromycetes) Applied to Laboratory Colonies of Solenopsis invicta Buren(Hymenoptera:Formicidae) in Soil, Journal of Economic Entomology, Apr. 1993, pp. 348-352, vol. 86 No. 2.

David H. Oi, et al., Field Applications of Beauveria bassiana for Control of the Red Imported Fire Ant (Hymenoptera: Formicidae), Journal of Economic Entomology, Jun. 1994, vol. 87, No. 3, 623-630.

Liu Xiao-Yan, et al., Advance in biological control of red imported fire ant, Solenopsis invicta (Hymenoptera : Formicidae), Guangdong Agricultural Sciences, 2006, pp. 18-23, vol. 5, China Academic Journal Electronic Publishing House.

* cited by examiner

Primary Examiner — Alton N Pryor
(74) Attorney, Agent, or Firm — Bayramoglu Law Offices LLC (57) ABSTRACT

A method for preparing a biopesticide preparation for preventing and controlling *Solenopsis invicta* comprising: a: preparing an agent containing pathogenic microorganisms for preventing and controlling *Solenopsis invicta*, the agent comprises *Beauveria bassiana* and sodium chloride, with a *Beauveria bassiana* spores to sodium chloride ratio of (1-8)×20 billion spores: 4.0-7.5 g; b: placing the agent into a solid container, and adding a corresponding amount of solution in a liquid container; inserting the solid container into the liquid container, wherein a retaining ring is stuck at the opening of the liquid container, a rubber gasket is pressed against the retaining ring, and a lid covers the rubber gasket and the retaining ring and is fixed to the opening of the liquid container.

5 Claims, 3 Drawing Sheets

METHOD FOR PREPARING BIOPESTICIDE PREPARATION FOR PREVENTING AND CONTROLLING *SOLENOPSIS INVICTA*

CROSS REFERENCES TO THE RELATED APPLICATIONS

This application is the national phase of International Application No. PCT/CN2017/116136, filed on Dec. 14, 2017, which is based upon and claims priority to Chinese Patent Application No. 201710835037.X (CN), filed on Sep. 15, 2017, the entire contents of which are incorporated herein by reference.

TECHNICAL FIELD

The present invention relates to the field of prevention and control of *Solenopsis invicta*, and particularly relates to a method for preparing a biopesticide preparation for preventing and controlling *Solenopsis invicta*.

BACKGROUND

*Beauveria bassiana*: *Beauveria bassiana* is an entomogenous ascomycete fungus. High-content powder formulation of *Beauveria bassiana* spores is non-toxic, odorless, and environment friendly, while presents a persistent infectivity to pests that it can continuously infect and spread once the pests are infected. No pesticide residues: Products are free of residues even if they are harvested immediately after application of *Beauveria bassiana*. No resistance: *Beauveria bassiana* kills pests by contacting the body wall of pests under natural conditions such that the pests will not develop resistance thereto, but instead, the efficacy will even get higher and higher after used continuously for years. Reproductivity: The novel biopesticide of *Beauveria bassiana* comprises living fungi and spores; after the biopesticide is applied to the field, the fungi can continue to reproduce and grow with appropriate temperature and humidity, and thereby the pesticidal effect is enhanced. High selectivity: Unlike chemical pesticides which indiscriminately kill both beneficial insects and pests, *Beauveria bassiana* is highly specific, and has less impact on non-target beneficial insects such as ladybugs, lacewings, and hoverflies. *Beauveria bassiana* is recognized as a green pesticide and ideal pesticide in the 21st century for the above characteristics. Therefore, the development and production of biopesticides has undoubtedly become an advanced behavior with both social and economic benefits. The development and use of biological preparations to control the invasive species *Solenopsis invicta* can not only safely and effectively control the pest, but also protect the ecological environment from damage.

Sodium chloride: Sodium chloride is a colorless cubic crystal or fine crystalline powder with the appearance of white crystals, mainly produced from sea water, and is the main component of common salt. Sodium chloride is neutral in aqueous solution and has good stability in the air; it is used to prepare physiological saline in medical field and can be used as condiments in daily life. In industry, sodium chloride is used to produce hydrogen gas, chlorine gas, caustic soda (sodium hydroxide) and other chemical products by electrolyzing saturated sodium chloride solution (commonly known as chlor-alkali industry), and can also be used in ore smelting (produce active metal sodium by electrolyzing molten sodium chloride crystals). Therefore, addition of sodium chloride as a synergist to biological agents will give many advantages. Firstly, sodium chloride is highly safe for humans and animals such that it is safe for application operators and residents of the application area, while does not exhibit repellency to *Solenopsis invicta*. *Secondly, sodium chloride is safe for the environment, does not pollute the air, and has little impact on the environment. Lastly, sodium chloride will not affect fish and other aquatic organisms essentially.*

Studies on the use of *Beauveria bassiana* in the control of *Solenopsis invicta* have already been carried out over the world. Stimac et al (1993) and Oi et al (1994) studied the control of *Solenopsis invicta* in the nests by *Beauveria bassiana* at different concentrations and different application methods, respectively indoors and in the field. Thus, the pathogenic fungus provides hope for sustainable control of *Solenopsis invicta* (Liu Xiao-Yan et al, 2006). Also, *Beauveria bassiana* is considered to be one of the promising pathogenic microorganisms. However, when *Beauveria bassiana* is applied in the field, the germination rate of spores is low due to the limitation from environmental conditions such as temperature, humidity, and ultraviolet light, affecting the pesticidal activity of *Beauveria bassiana*; thus, application of the pathogenic microorganism *Beauveria bassiana* alone in the control of *Solenopsis invicta* exhibits low efficiency. The above disadvantages can be effectively overcome by combining two or more components. Also, the synergistic effect produced by mixing two components can improve the prevention effect, lessen applications, save costs, and improve the efficiency of pest control.

SUMMARY

One object of the present invention is to provide a method for preparing a biopesticide preparation for preventing and controlling *Solenopsis invicta*. The biopesticide preparation for preventing and controlling *Solenopsis invicta*, produced by the method, is easy to use and transport, time and labor-saving, and ready for use once prepared. Once applied, the germination environment of agent (spores) is improved and the pesticide effect is increased, so as to realize the prevention and control of *Solenopsis invicta* in the wild.

The method of the present invention for preparing a biopesticide preparation for preventing and controlling *Solenopsis invicta*, is characterized in that, it comprises the following steps:

mixer: the mixer comprises a liquid container, a solid container, a rubber gasket and a lid; the solid container is a container with an upper end having an opening and a lower end sealed with an aluminum foil composite film, and a retaining ring is disposed at an edge of the opening of the solid container; the solid container is inserted into an opening of the liquid container, so that the retaining ring is stuck at the opening of the liquid container, the rubber gasket is pressed against the retaining ring, and the lid covers the rubber gasket and the retaining ring and is fixable to the opening of the liquid container; a diversion hole is disposed at a top of the lid;

a: preparing an agent containing pathogenic microorganisms for preventing and controlling *Solenopsis invicta*, wherein the agent containing pathogenic microorganisms for preventing and controlling *Solenopsis invicta* comprises *Beauveria bassiana* and sodium chloride, with a *Beauveria bassiana* spores to sodium chloride ratio of (1-8)×20 billion spores: 4.0-7.5 g;

b: placing the agent containing pathogenic microorganisms for preventing and controlling *Solenopsis invicta* into the solid container, and adding a corresponding amount of solution in the liquid container; inserting the solid container into the liquid container, wherein the retaining ring is stuck at the opening of the liquid container, the rubber gasket is pressed against the retaining ring, and the lid covers the rubber gasket and the retaining ring and is fixed to the opening of the liquid container. The retaining ring can seal the opening of the liquid container so that a liquid in the liquid container does not get out.

When applied, a needle of a syringe is inserted directly into the diversion hole at the top of the lid to pierce the aluminum foil composite film at the lower end of the solid container so that the agent containing pathogenic microorganisms for preventing and controlling Solenopsis invicta falls into the solution in the liquid container, and then the mixture is shaken well to give an aqueous dispersion.

Preferably, a rubber washer is provided at the opening of the liquid container, and the retaining ring is pressed against the rubber washer. The rubber washer is configured to seal the opening of the liquid container.

The agent containing pathogenic microorganisms for preventing and controlling Solenopsis invicta is preferably a water dispersible granule formulation, comprising by mass of 100%, totally 30% of a Beauveria bassiana powder formulation and sodium chloride wherein a mass ratio of the Beauveria bassiana powder formulation to sodium chloride is 5:4.0-7.5 g and the Beauveria bassiana powder formulation contains 20 billion Beauveria bassiana spores per gram, 8% of wetting agent butylnaphtalenesulfonic acid sodium salt, 18% of dispersant sodium lignosulfonate, 5% of disintegrant calcium chloride, 2% of stabilizer disodium hydrogen phosphate, 5% of binder sodium polyacrylate, and 32% of carrier diatomite.

Preferably, the Beauveria bassiana spores to sodium chloride ratio is 5×20 billion spores: 4.38-7.30 g, and further preferably 5×20 billion spores: 7.30 g.

Preferably, in the step of placing the agent containing pathogenic microorganisms for preventing and controlling Solenopsis invicta into the solid container and adding a corresponding amount of solution in the liquid container, the agent containing pathogenic microorganisms for preventing and controlling Solenopsis invicta and the sodium chloride are provided in such an amount that, after the agent containing pathogenic microorganisms for preventing and controlling Solenopsis invicta and the sodium chloride are dissolved in the solution, the solution contains $1×10^8$/mL of Beauveria bassiana spores and 75-125 mmol/L of sodium chloride.

The inventors had discovered through experiments that, the combination of Beauveria bassiana and sodium chloride exhibited significant synergism that gave an efficient and raid effect in the prevention and controlling of Solenopsis invicta, with the characteristic of non-toxic to humans and animals, non-polluting to soil and groundwater resources, and highly safe, not only improving the pesticidal effect of Beauveria bassiana, but also slowing down the increase of pesticide resistance of Solenopsis invicta and reducing environmental pollution, thereby improving the prevention effect, saving costs, and avoiding the occurrence of pesticide resistance.

In the biopesticide preparation for preventing and controlling Solenopsis invicta, the agent containing pathogenic microorganisms for preventing and controlling Solenopsis invicta and the solution are separate from each other. When applied, the aluminum foil composite film is pierced so that the agent containing pathogenic microorganisms for preventing and controlling Solenopsis invicta falls into the solution, and then the mixture is shaken well to give the dispersion of biopesticide preparation for preventing and controlling Solenopsis invicta.

In summary, the biopesticide preparation for preventing and controlling Solenopsis invicta, provided by the present invention, can be stored for a long period, easy to use and transport, time and labor-saving, and ready for use once prepared. Once applied, the germination environment of agent (spores) is improved and the pesticide effect is increased, so as to realize the prevention and control of Solenopsis invicia in the wild.

Reference signs: 1. diversion hole; 2. lid; 3. rubber gasket; 4. solid container; 5. aluminum foil composite film; 6. rubber washer; 7. opening of the liquid container; 8. liquid container; 9. retaining ring.

DETAILED DESCRIPTION OF THE EMBODIMENTS

Beauveria bassiana is a widely-used entomopathogenic fungus, which is sold by all major collection centers such as the Guangdong Microbial Culture Collection Center, or can be purchased from a company that produces Beauveria bassiana, such as Jiangxi Tianren Ecology Co., Ltd.

The following embodiments are intended to further describe the present invention, but not to limit the present invention.

Embodiment 1: Laboratory Virulence Test of the Combination of Beauveria bassiana and Sodium Chloride Against Solenopsis invicta Worker Ants In the laboratory virulence test, 5 g of Beauveria bassiana powder formulation was dissolved in 1 L of water and mixed well to give a *Beauveria bassiana* solution. The used *Beauveria bassiana* powder formulation contained 20 billion/g of *Beauveria bassiana* spores. 9 *Beauveria bassiana* solutions, 100 mL each, were taken from the 1L *Beauveria bassiana* solution, and respectively added with NaCl so that NaCl concentrations in the 9 *Beauveria bassiana* solutions were: 0 mmol/L, 25 mmol/L, 75 mmol/L, 100 mmol/L, 125 mmol/L, 150 mmol/L, 200 mmol/L, 250 mmol/L, and 300 mmol/L, and thereby *Beauveria bassiana*/sodium chloride aqueous dispersions were obtained, wherein the *Beauveria bassiana* spores were present in a concentration of $1 \times 10^8$/mL.

The *Beauveria bassiana* solution, the *Beauveria bassiana*/sodium chloride aqueous solution, a sodium chloride solution (125 mmol/L), and sterile water were respectively tested for virulence against healthy *Solenopsis invicta* worker ants, with 3 replicates for each treatment, 1 petri dish in each replicate, and 100 *Solenopsis invicta* worker ants in each petri dish. The *Solenopsis invicta* worker ants were firstly dipped in the solution for about 5 seconds and then taken out; after air dried indoors, they were placed in a breeding box, fed with fresh honey water every day, and kept at $26 \pm 1°$ C., a humidity of 70-90%, and a photoperiod of 14 L/10 hD; 96 hours after the treatment, survival of the *Solenopsis invicta* worker ants were observed to calculate the mortality. Data statistical analysis was performed using SPSS 13.0 software, significance testing between samples was performed using the Duncan's method, wherein different lowercase letters indicate a significant difference ($P<0.05$) in cumulative mortality of the treated *Solenopsis invicta*.

Figure 1:
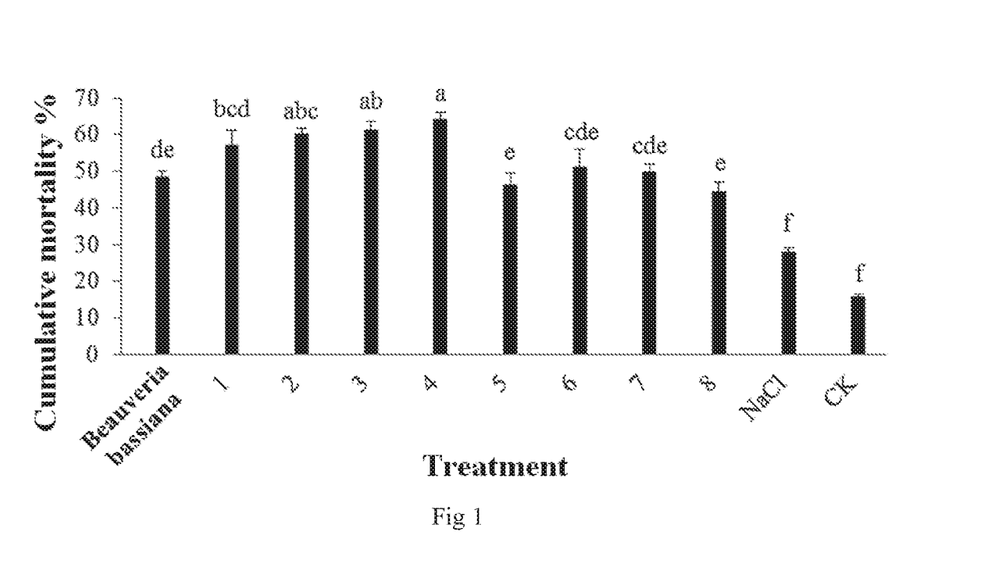
FIG. 1 shows the cumulative mortality of Solenopsis invicta after applying agents in different concentrations in Embodiment 1 for 96 hours, wherein, "Beauveria bassiana": 5 g/L aqueous solution of Beauveria bassiana; 1: Beauveria bassiana+25 mmol/L NaCl; 2: Beauveria bassiana+75 mmol/L NaCl; 3: Beauveria bassiana+100 mmol/L NaCl; 4: Beauveria bassiana+125 mmol/L NaCl; 5: Beauveria bassiana+150 mmol/L NaCl; 6: Beauveria bassiana+200 mmol/L NaCl; 7: Beauveria bassiana+250 mmol/L NaCl; 8: Beauveria bassiana+300 mmol/L NaCl; CK: sterile water; NaCl: 125 mmol/L aqueous solution of NaCl.

Results were as shown in FIG. 1. As can be seen from FIG. 1, for the *Solenopsis invicta* treated with merely NaCl, no significant difference in the 96 h cumulative mortality was observed as compared with the blank control (*Solenopsis invicta* treated with sterile water, 15.91±0.72%), suggesting that the use of merely NaCl had no killing effect on *Solenopsis invicta*. For the *Solenopsis invicta* treated with merely *Beauveria bassiana* solution, significant differences in the 96 h cumulative mortality were observed as compared with the use of merely NaCl and the blank control, suggesting that the use of merely *Beauveria bassiana* exhibited a certain pesticidal effect, while the mortality was low. When sodium chloride was mixed in a concentration of 75 mmol/L, 100 mmol/L, or 125 mmol/L with *Beauveria bassiana* (i.e., the solutions contained $1 \times 10^8$/mL of spores and 75-125 mmol/L of NaCl), significant differences in the 96 h cumulative mortality were observed as compared with the use of merely *Beauveria bassiana* and the use of merely NaCl, suggesting that the combination of sodium chloride with *Beauveria bassiana* in a certain ratio would significantly increase the pesticidal effect against *Solenopsis invicta*, and thereby demonstrating that the mixture exhibited a significant synergism in pesticidal effect as compared with the use of merely NaCl or *Beauveria bassiana*.

The inventors had also conducted the above test with calcium chloride, potassium chloride, magnesium chloride, ammonium sulfate, and ferric chloride instead of sodium chloride. Results showed that, none of calcium chloride, potassium chloride, magnesium chloride, ammonium sulfate, and ferric chloride provided a synergism that, addition of these compounds did not largely affect the pesticidal effect of *Beauveria bassiana* on *Solenopsis invicta*, and no significant difference was observed.

Figure 3:
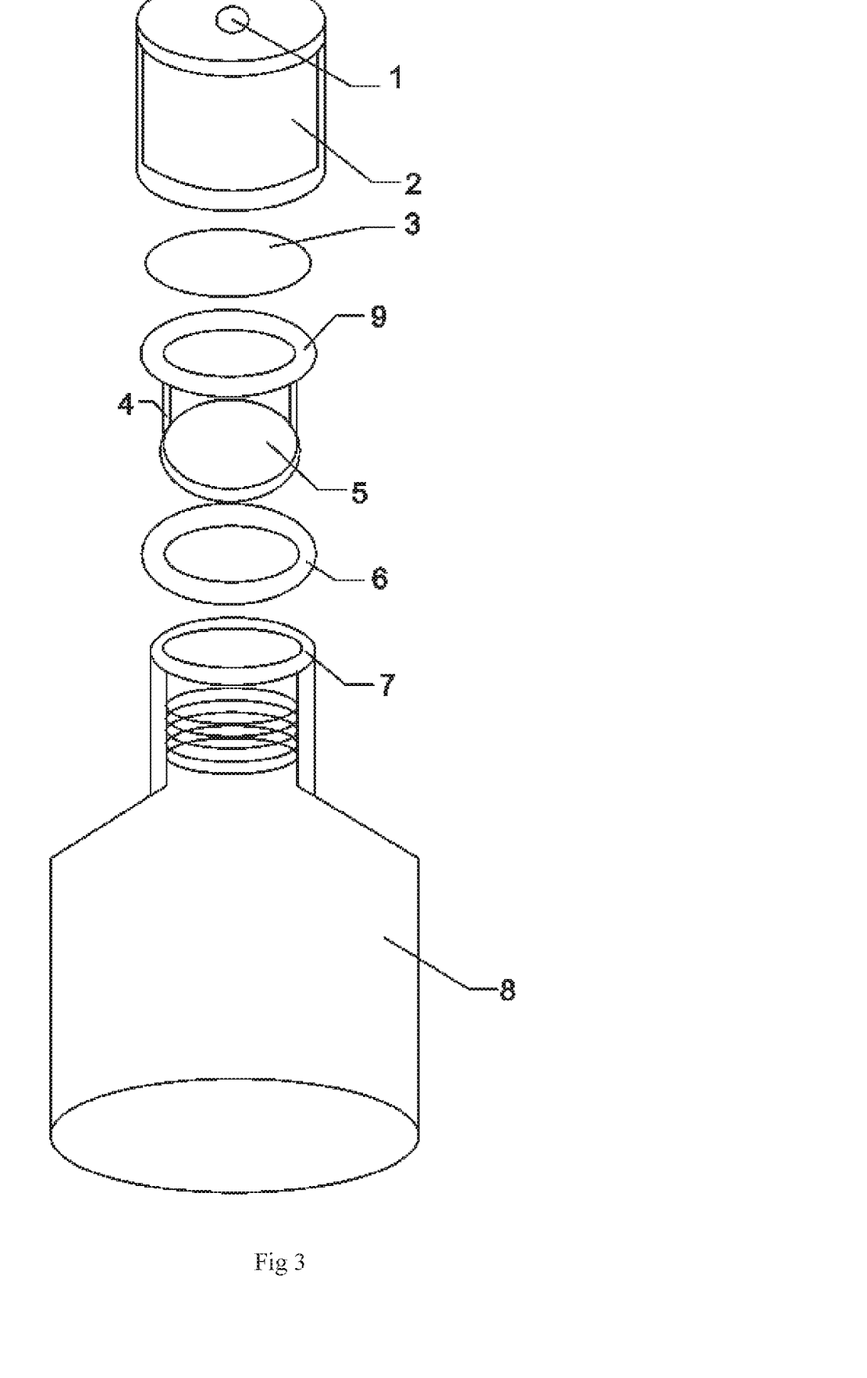
FIG. 3. shows a split structure of the mixer of the preparation for preventing and controlling Solenopsis invicta.
Figure 4:
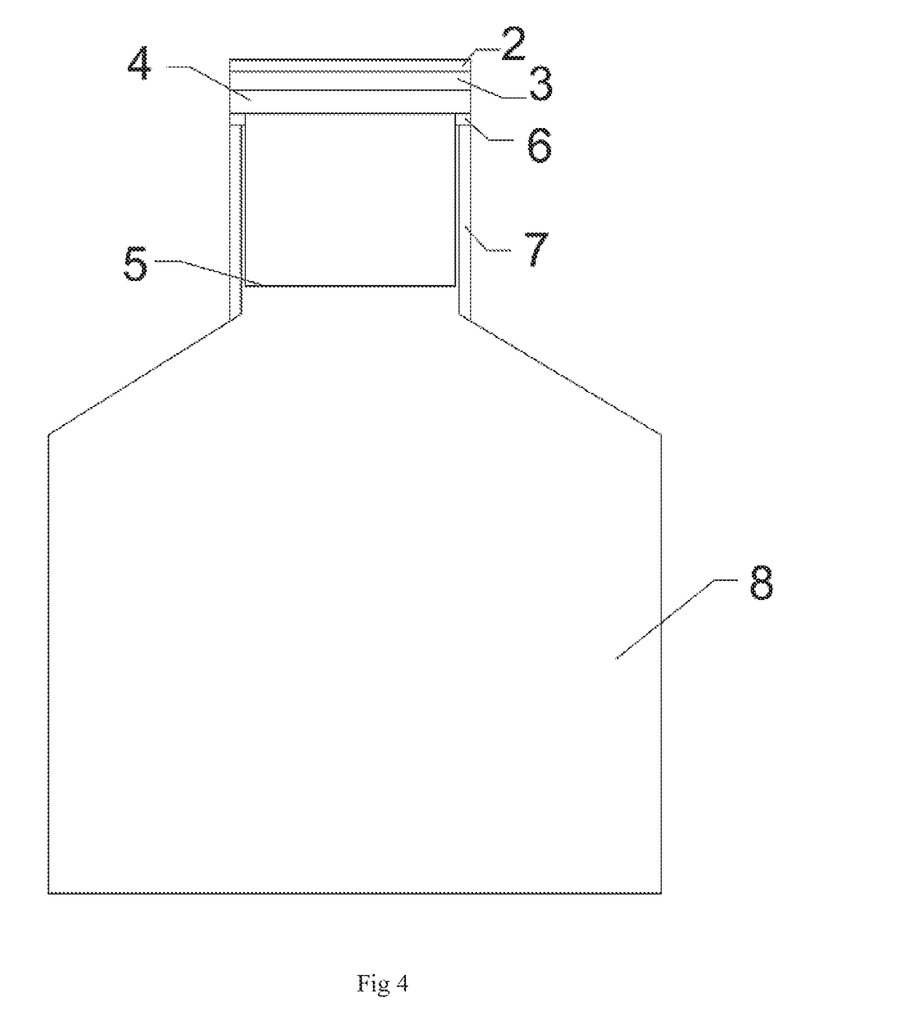
FIG. 4. is a sectional view of the overall structure of the mixer of the preparation for preventing and controlling Solenopsis invicta.

Embodiment 2: Laboratory Virulence Test of the *Beauveria bassiana*/Sodium Chloride Aqueous Dispersion Against *Solenopsis invicta* Worker Ants As shown in FIG. 3 and FIG. 4, in the instant embodiment, the mixer of the preparation for preventing and controlling *Solenopsis invicta* comprised a liquid container 8, a solid container 4, a rubber gasket 3 and a lid 2; the solid container 4 is a container with an upper end having an opening and a lower end sealed with an aluminum foil composite film 5, and a retaining ring 9 is disposed at an edge of the opening of the solid container; a rubber washer 6 is provided at an opening 7 of the liquid container; the solid container is inserted into the opening 7 of the liquid container through the rubber washer 6, so that the retaining ring 9 is pressed against the rubber washer 6, the rubber gasket 3 is pressed against the retaining ring 9, and the lid 2 covers the rubber gasket 3, the retaining ring 9 and the rubber washer 3 and is fixed to the opening 7 of the liquid container; a diversion hole 1 is disposed at a top of the lid.

A totally 30 g of *Beauveria bassiana* powder formulation and sodium chloride (wherein a mass ratio of the *Beauveria bassiana* powder formulation to sodium chloride included 5:1.46, 5:4.38, 5:5.84, 5:7.30, 5:8.77, 5:11.69, 5:14.61 g, and 5:17.53, and the *Beauveria bassiana* powder formulation contained 20 billion *Beauveria bassiana* spores per gram), 8 g of wetting agent butylnaphtalenesulfonic acid sodium salt, 18 g of dispersant sodium lignosulfonate, 5 g of disintegrant calcium chloride, 2 g of stabilizer disodium hydrogen phosphate, 5 g of binder sodium polyacrylate, and 32 g of carrier diatomite, were weighed out and mixed according to a method for preparing a water dispersible granule formulation (1. The raw materials were mixed evenly according to the formula. 2. The materials were ground using a sand mill after mixed evenly, and subjected to spray granulation after determined to be acceptable. 3. The products were screened using a vibrating screen after the spray granulation, products with unacceptable appearance were returned to the sand mill to be ground again, and products with acceptable appearance were further subjected to quality inspection wherein products with unacceptable quality were also returned to the sand mill to be ground again. 4. Products with acceptable quality were packaged. 5. Packaged water dispersible granule formulation were put into storage), to eventually produce water dispersible granule formulations containing 30% by mass of *Beauveria bassiana*/sodium chloride (an agent containing pathogenic microorganisms for preventing and controlling *Solenopsis invicta*).

The above water dispersible granule formulations containing 30% by mass of *Beauveria bassiana*/sodium chloride were respectively placed in different solid containers, and liquid containers were filled with 1 L of sterile water. A rubber washer was provided at an opening of each liquid container. Then the solid containers were inserted into the liquid containers, wherein the retaining ring was stuck at the rubber washer, the rubber gasket was pressed against the retaining ring, and the lid covered the rubber gasket, the retaining ring and the rubber washer and was fixed to the opening of the liquid container. With such configuration, the formulation was convenient for storage and transportation; when applied, it was not necessary to unscrew the lid, but instead, a needle of a syringe was inserted directly into the diversion hole at the top of the lid to pierce the aluminum foil composite film at the lower end of the solid container so that the water dispersible granule formulation for preventing and controlling *Solenopsis invicta* fell into the solution in the liquid container, and then the mixture was shaken well to give an aqueous dispersion of the water dispersible granule formulation. In each aqueous dispersion of water dispersible granule formulation, the concentration of *Beauveria bassiana* spores was $1\times10^8$/mL, while the concentration of NaCl was respectively 25 mmol/L: (FIG. 2, 1), 75 mmol/L (FIG. 2, 2), 100 mmol/L (FIG. 2, 3), 125 mmol/L (FIG. 2, 4), 150 mmol/L (FIG. 2, 5), 200 mmol/L (FIG. 2, 6), 250 mmol/L (FIGS. 2, 7), and 300 mmol/L (FIG. 2, 8).

Figure 2:
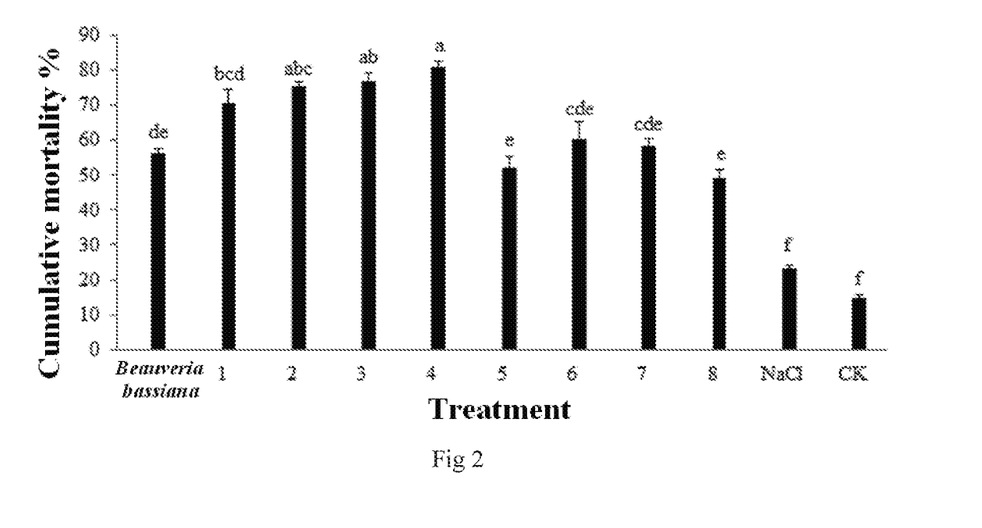
FIG. 2 shows the cumulative mortality of Solenopsis invicta after applying different aqueous solutions of Beauveria bassiana/NaCl in Embodiment 2 for 96 hours, wherein, "Beauveria bassiana": Beauveria bassiana group; 1: Beauveria bassiana+25 mmol/L NaCl+adjuvant; 2: Beauveria bassiana+75 mmol/L NaCl+adjuvant; 3: Beauveria bassiana+100 mmol/L NaCl+adjuvant; 4: Beauveria bassiana+125 mmol/L NaCl+adjuvant; 5: Beauveria bassiana+150 mmol/L NaCl+adjuvant; 6: Beauveria bassiana 200 mmol/L NaCl+adjuvant; 7: Beauveria bassiana+250 mmol/L NaCl+adjuvant; 8: Beauveria bassiana+300 mmol/L NaCl+adjuvant; CK: sterile water+adjuvant; NaCl: 125 mmol/L aqueous solution of NaCl+adjuvant.

An aqueous solution containing $1\times10^8$ mL$^{-1}$ of *Beauveria bassiana* spores (a *Beauveria bassiana* solution) was taken as control, wherein the aqueous solution further comprised adjuvants of the concentrations identical to those in the above test group (the wetting agent butylnaphtalenesulfonic acid sodium salt, the dispersant sodium lignosulfonate, the disintegrant calcium chloride, the stabilizer disodium hydrogen phosphate, the binder sodium polyacrylate, and the carrier diatomite), and was named as a *Beauveria bassiana* group (FIG. 2, *Beauveria bassiana*).

An aqueous solution containing 125 mmol/L of sodium chloride was taken as control, wherein the aqueous solution further comprised adjuvants of the concentrations identical to those in the above test group (the wetting agent butylnaphtalenesulfonic acid sodium salt, the dispersant sodium lignosulfonate, the disintegrant calcium chloride, the stabilizer disodium hydrogen phosphate, the binder sodium polyacrylate, and the carrier diatomite), and was named as a NaCl group (FIG. 2, NaCl).

Sterile water was also taken as control (CK), wherein the water further comprised adjuvants of the concentrations identical to those in the above test group (the wetting agent butylnaphtalenesulfonic acid sodium salt, the dispersant sodium lignosulfonate, the disintegrant calcium chloride, the stabilizer disodium hydrogen phosphate, the binder sodium polyacrylate, and the carrier diatomite), and was named as a CK group (FIG. 2, CK).

The *Beauveria bassiana* solution (the *Beauveria bassiana* group), the aqueous dispersions of *Beauveria bassiana*/sodium, chloride water dispersible granule formulations, the sodium chloride solution (the NaCl group), and the sterile water (CK) were respectively tested for virulence against healthy *Solenopsis invicta* worker ants, with 3 replicates for each treatment, 1 petri dish in each replicate, and 100 *Solenopsis invicta* worker ants in each petri dish. The *Solenopsis invicta* worker ants were firstly dipped in the solution for about 5 seconds and then taken out; after air dried indoors, they were placed in a breeding box, fed with fresh honey water every day, and kept at 26±1° C., a humidity of 70-90%, and a photoperiod of 14 L/10 hD; 96 hours after the treatment, survival of the *Solenopsis invicta* worker ants were observed to calculate the mortality. Data statistical analysis was performed using SPSS 13.0 software, significance testing between samples was performed using the Duncan's method, wherein different lowercase letters indicate a significant difference (P<0.05) in cumulative mortality of the treated *Solenopsis invicta*.

Results were as shown in FIG. 2. As can be seen from FIG. 2, for the *Solenopsis invicta* treated with merely NaCl, no significant difference in the 96 h cumulative mortality was observed as compared with the blank control (*Solenopsis invicta* treated with sterile water), suggesting that the use of merely NaCl had no killing effect on *Solenopsis invicta*. For the *Solenopsis invicta* treated with merely *Beauveria bassiana* solution, significant differences in the 96 h cumulative mortality were observed as compared with the use of merely NaCl and the blank control, suggesting that the use of merely *Beauveria bassiana* exhibited a certain pesticidal effect, while the mortality was low. When sodium chloride was mixed in a concentration of 75 mmol/L, 100 mmol/L, or 125 mmol/L with *Beauveria bassiana*, significant differences in the 96 h cumulative mortality were observed as compared with the use of merely *Beauveria bassiana* and the use of merely NaCl, suggesting that the combination of sodium chloride with *Beauveria bassiana* in a certain ratio would significantly increase the pesticidal effect against *Solenopsis invicta*, and thereby demonstrating that the mixture exhibited a significant synergism in pesticidal effect as compared with the use of merely NaCl or *Beauveria bassiana*.

In addition as can be seen from FIG. 2, the *Beauveria bassiana*/sodium chloride aqueous dispersions, which were formed of *Beauveria bassiana*, sodium chloride and adjuvants, exhibited a pesticidal effect similar to those of the *Beauveria bassiana*/sodium water solution without the adjuvants.

Embodiment 3

In the laboratory virulence test, 1 g of *Beauveria bassiana* powder formulation and 7.5 g of sodium chloride were dissolved in 1 L of water and mixed well to give a *Beauveria bassiana* solution, wherein the *Beauveria bassiana* powder formulation contained 20 billion/g of *Beauveria bassiana* spores.

The laboratory virulence test was conducted according to the method of embodiment 1, and results showed that the *Beauveria bassiana* solution of the instant embodiment exhibited a high killing effect on *Solenopsis invicta*.

Embodiment 4

In the laboratory virulence test, 8 g of *Beauveria bassiana* powder formulation and 4.0 g of sodium chloride were dissolved in 1 L of water and mixed well to give a *Beauveria bassiana* solution, wherein the *Beauveria bassiana* powder formulation contained 20 billion/g of *Beauveria bassiana* spores.

The laboratory virulence test was conducted according to the method of embodiment 1, and results showed that the *Beauveria bassiana* solution of the instant embodiment exhibited a high killing effect on *Solenopsis invicta*.

Embodiment 5

As shown in FIG. 3 and FIG. 4, in the instant embodiment, the mixer of the preparation for preventing and controlling *Solenopsis invicta* comprised a liquid container 8, a solid container 4, a rubber gasket 3 and a lid 2; the solid container 4 is a container with an upper end having an opening and a lower end sealed with an aluminum foil composite film 5, and a retaining ring 9 is disposed at an edge of the opening of the solid container; a rubber washer 6 is provided at an opening 7 of the liquid container; the solid container is inserted into the opening 7 of the liquid container, so that the retaining ring 9 is pressed against the rubber washer 6, the rubber gasket 3 is pressed against the retaining ring 9, and the lid 2 covers the rubber gasket 3, the retaining ring 9 and the rubber washer 3 and is fixed to the opening 7 of the liquid container; a diversion hole 1 is disposed at a top of the lid.

A totally 30 g of *Beauveria bassiana* powder formulation and sodium chloride (wherein a mass ratio of the *Beauveria bassiana* powder formulation to sodium chloride was 5:7.30, and the *Beauveria bassiana* powder formulation contained 20 billion *Beauveria bassiana* spores per gram), 8 g of wetting agent butylnaphtalenesulfonic acid sodium salt, 18 g of dispersant sodium lignosulfonate, 5 g of disintegrant calcium chloride, 2 g of stabilizer disodium hydrogen phosphate, 5 g of binder sodium polyacrylate, and 32 g of carrier diatomite, were weighed out and mixed according to a method for preparing a water dispersible granule formulation (1. The raw materials were mixed evenly according to the formula. 2. The materials were ground using a sand mill after mixed evenly, and subjected to spray granulation after determined to be acceptable. 3. The products were screened using a vibrating screen after the spray granulation, products with unacceptable appearance were returned to the sand mill to be ground again, and products with acceptable appearance were further subjected to quality inspection wherein products with unacceptable quality were also returned to the sand mill to be ground again. 4. Products with acceptable quality were packaged. 5. Packaged water dispersible granule formulation were put into storage), to eventually produce water dispersible granule formulations containing 30% by mass of *Beauveria bassiana*/sodium chloride.

41 g of the above water dispersible granule formulation containing 30% by mass of *Beauveria bassiana*/sodium chloride was placed in a solid container, and a liquid container was filled with 1 L of sterile water. A rubber washer was provided at an opening of the liquid container. Then the solid container was inserted into the liquid container, wherein the retaining ring was stuck at the rubber washer, the rubber gasket was pressed against the retaining ring, and the lid covered the rubber gasket, the retaining ring and the rubber washer and was fixed to the opening of the liquid container, With such configuration, the formulation was convenient for storage and transportation; when applied, it was not necessary to unscrew the lid, but instead, a needle of a syringe was inserted directly into the diversion hole at the top of the lid to pierce the aluminum foil composite film at the lower end of the solid container so that the water dispersible granule formulation for preventing and controlling *Solenopsis invicta* fell into the solution in the liquid container, and then the mixture was shaken well to give an aqueous dispersion of the water dispersible granule formulation. Distilled water was taken as control (CK).

The above aqueous dispersion of the water dispersible granule formulation containing 30% by mass of *Beauveria bassiana*/sodium chloride was injected according to a method described in Embodiment 6 of the Chinese Patent 201510103303.0 with a title as AN INJECTION-IN-NEST METHOD FOR BIOLOGICAL PREVENTION AND CONTROL OF *SOLENOPSIS INVICTA*. Results were as shown in Table 1.

What is claimed is:

1. A method for preparing a biopesticide preparation for preventing and controlling *Solenopsis invicta*, wherein the method comprises the following steps:
   providing a mixer comprising a liquid container, a solid container, a rubber gasket and a lid; the solid container is a container with an upper end having an opening and a lower end sealed with an aluminum foil composite film, and a retaining ring is disposed at an edge of the opening of the solid container; the solid container is inserted into an opening of the liquid container, so that the retaining ring is stuck at the opening of the liquid container, the rubber gasket is pressed against the retaining ring, and the lid covers the rubber gasket and the retaining ring and is fixable to the opening of the liquid container; a diversion hole is disposed at a top of the lid;
   a: preparing an agent containing pathogenic microorganisms for preventing and controlling *Solenopsis invicta*, wherein the agent containing the pathogenic microorganisms for preventing and controlling *Solenopsis invicta* is a water dispersible granule formulation, comprising by mass of 100%, totally 30% of a *Beauveria bassiana* powder formulation and sodium chloride wherein a mass ratio of the *Beauveria bassiana* powder formulation to sodium chloride is 1-8:4.0-7.5 and the *Beauveria bassiana* powder formulation contains 20 billion *Beauveria bassiana* spores per gram, 8% of wetting agent butylnaphtalenesulfonic acid sodium salt, 18% of dispersant sodium lignosulfonate, 5% of disintegrant calcium chloride, 2% of stabilizer disodium hydrogen phosphate, 5% of binder sodium polyacrylate, and 32% of carrier diatomite; and
   b: placing the agent containing the pathogenic microorganisms for preventing and controlling *Solenopsis invicta* into the solid container, and adding an amount of water in the liquid container; inserting the solid container into the liquid container, wherein the retaining ring is stuck at the opening of the liquid container, the rubber gasket is pressed against the retaining ring, and the lid covers the rubber gasket and the retaining ring and is fixed to the opening of the liquid container.

2. The method for preparing a biopesticide preparation for preventing and controlling *Solenopsis invicta* according to claim 1, wherein a rubber washer is provided at the opening of the liquid container, and the retaining ring is pressed against the rubber washer.

3. The method for preparing a biopesticide preparation for preventing and controlling *Solenopsis invicta* according to

TABLE 1

Results of injection-in-nest prevention and control of *Solenopsis invicta*

| Treatment | Dosage (ml/nest) | Decreasing rate (%) | 4 days after treatment | 10 days after treatment | 20 days after treatment | 30 days after treatment |
|---|---|---|---|---|---|---|
| aqueous dispersion of water dispersible granule formulation containing 30% by mass of *Beauveria bassiana*/sodium chloride (injection method) | 500 | Decreasing rate of nests after treatment (%) | 60 | 66.67 | 80 | 93.33 |
| | 500 | Decreasing rate of worker ants after treatment (%) | 84.38 | 90.37 | 96.03 | 98.35 |
| Blank (CK) | 500 | Decreasing rate of nests/worker ants (%) | 0 | 0 | 0 | 0 | claim 1 wherein the *Beauveria bassiana* spores to sodium chloride ratio is 5×20 billion spores: 4.38-7.30 g.

4. The method for preparing a biopesticide preparation for preventing and controlling *Solenopsis invicta* according to claim 3, wherein the *Beauveria bassiana* spores to sodium chloride ratio is 5×20 billion spores: 7.30 g.

5. The method for preparing a biopesticide preparation for preventing and controlling *Solenopsis invicta* according to claim 1 wherein in the step of placing the agent containing the pathogenic microorganisms for preventing and controlling *Solenopsis invicta* into the solid container and adding an amount of water in the liquid container, the agent containing pathogenic microorganisms for preventing and controlling *Solenopsis invicta* and the sodium chloride are provided in an amount that, after the agent containing the pathogenic microorganisms for preventing and controlling *Solenopsis invicta* and the sodium chloride are dissolved in the water, the water contains $1\times10^8$/mL of *Beauveria bassiana* spores and 75-125 mmol/L of sodium chloride.

\* \* \* \* \*

UNITED STATES PATENT AND TRADEMARK OFFICE
CERTIFICATE OF CORRECTION

PATENT NO. : 11,350,634 B2
APPLICATION NO. : 16/647029
DATED : June 7, 2022
INVENTOR(S) : Jun Li et al.

Page 1 of 1

It is certified that error appears in the above-identified patent and that said Letters Patent is hereby corrected as shown below:

On the Title Page

Item (71) The Applicant's Name should be read as below:
--INSTITUTE OF ZOOLOGY, GUANGDONG ACADEMY OF SCIENCES--

Signed and Sealed this
Twenty-fourth Day of January, 2023

Katherine Kelly Vidal
*Director of the United States Patent and Trademark Office*